United States Patent
Robillon et al.

(10) Patent No.: US 10,131,198 B2
(45) Date of Patent: Nov. 20, 2018

(54) STORAGE EVAPORATOR WITH CORRUGATED PLATE DESIGN FACILITATING THE FREEZING OF THE PCM

(71) Applicant: Valeo Systemes Thermiques, Le Mesnil Saint Denis (FR)

(72) Inventors: Lionel Robillon, Mulsanne (FR); Aurélie Bellenfant, Roeze-sur-Sarthe (FR); Julien Tissot, Puteaux (FR); Sylvain Moreau, Spay (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/512,384

(22) PCT Filed: Sep. 16, 2015

(86) PCT No.: PCT/EP2015/071265
§ 371 (c)(1),
(2) Date: Mar. 17, 2017

(87) PCT Pub. No.: WO2016/042048
PCT Pub. Date: Mar. 24, 2016

(65) Prior Publication Data
US 2017/0253103 A1    Sep. 7, 2017

(30) Foreign Application Priority Data
Sep. 17, 2014 (FR) ..................... 14 58772

(51) Int. Cl.
*B60H 1/00* (2006.01)
*F28F 3/04* (2006.01)
(Continued)

(52) U.S. Cl.
CPC ........... *B60H 1/005* (2013.01); *B60H 1/3227* (2013.01); *F28D 1/0308* (2013.01);
(Continued)

(58) Field of Classification Search
CPC ....... F28D 2020/013; F28D 2020/0078; F28D 2020/0065; F28D 20/02; B60H 1/005
See application file for complete search history.

(56) References Cited

U.S. PATENT DOCUMENTS 9,885,513 B2 * 2/2018 Litch .................. F25D 21/12
2010/0065244 A1 * 3/2010 Yokoyama .......... F28D 1/05383
165/10
2010/0307180 A1 12/2010 Yamada et al.

FOREIGN PATENT DOCUMENTS

DE  10 2007 048 416 A1    4/2009
JP      2013 061 136 A      4/2013
(Continued)

OTHER PUBLICATIONS

International Search Report issued in PCT/EP2015/071265 dated Dec. 9, 2015 (2 pages).
(Continued)

Primary Examiner — Cassey D Bauer
(74) Attorney, Agent, or Firm — Osha Liang LLP

(57) ABSTRACT

The evaporator (12) for a motor vehicle air conditioning device comprises at least one refrigerant tube (22, 22A) intended to allow the circulation of a refrigerant fluid and at least one storage member (10) comprising at least one housing (16, 20) comprising a material referred to as a thermal storage material (21) intended to store frigories and release them to a ventilation fluid intended to circulate towards an interior of the vehicle. The housing (16) has a substantially hemispherical shape.

8 Claims, 3 Drawing Sheets

(51) Int. Cl.
*F28D 1/03* (2006.01)
*F28D 20/02* (2006.01)
*B60H 1/32* (2006.01)
F28D 21/00 (2006.01)
F28D 20/00 (2006.01)

(52) U.S. Cl.
CPC ........... *F28D 1/0341* (2013.01); *F28D 20/02* (2013.01); *F28F 3/044* (2013.01); *F28D 2020/0008* (2013.01); *F28D 2020/0013* (2013.01); *F28D 2021/0085* (2013.01); *Y02E 60/145* (2013.01)

(56) References Cited

FOREIGN PATENT DOCUMENTS

| | | |
|---|---|---|
| JP | 2013 173 393 A | 9/2013 |
| WO | 2013 125 533 A1 | 8/2013 |

OTHER PUBLICATIONS

Written Opinion of the International Searching Authority issued in PCT/EP2015/071265 dated Dec. 9, 2015 (5 pages).

* cited by examiner

STORAGE EVAPORATOR WITH CORRUGATED PLATE DESIGN FACILITATING THE FREEZING OF THE PCM

BACKGROUND

The invention relates to an evaporator for a motor vehicle air conditioning device.

The evaporator, connected to the rest of the air-conditioning circuit of a motor vehicle, has the function of cooling a ventilation fluid intended to be blown into the vehicle interior. In general, the ventilation fluid is air from outside the vehicle.

The evaporator thus comprises a plurality of refrigerant tubes inside which a refrigerant fluid circulates. On contact with these refrigerant tubes, the ventilation fluid gives up some of its calories to the refrigerant tubes and is therefore cooled. The fluid is made to circulate inside the air-conditioning circuit by a compressor usually driven by an engine of the motor vehicle.

Therefore, when the vehicle engine is switched off, the circulation of the refrigerant fluid in the device no longer takes place and the exchange of heat between the air and the refrigerant fluid can no longer take place. The air blown into the vehicle interior is then no longer cooled. This situation is all the more problematical when fuel economy systems plan for the engine to be switched off automatically when the car is stationary, thus preventing the air-conditioning device from operating.

It is known practice to provide the evaporator with a reservoir of thermal storage material. During engine operation, the refrigerant fluid circulating in the evaporator simultaneously cools the air passing through the evaporator and the reservoir of thermal storage material. When the engine is switched off, the thermal storage material releases the frigories previously accumulated in order to cool the air passing through the evaporator. It will be recalled that, by analogy with a calorie, a frigory corresponds to the amount of heat needed to reduce the temperature of one gram of water by 1° C. from 14.5 to 15.5° C. under standard atmospheric pressure.

It is also known practice to use, by way of thermal storage material, a phase change material referred to by the abbreviation PCM. When the PCM is in contact with the refrigerant fluid, it solidifies. When the engine is switched off, the PCM liquefies and therefore releases frigories to the air passing through the evaporator.

It is known practice to arrange the PCM in tubes with a checkerboard geometry associated with refrigerant tubes likewise arranged in a checkerboard configuration.

However, with this arrangement, the distribution of the pressures within the tubes is heterogeneous. It is therefore necessary to manufacture tubes which are thicker in order to withstand this difference in pressure, and this makes the evaporator heavier.

Examples of evaporators equipped with storage members comprising pluralities of housings forming reservoirs of phase change material are also known from applications US-2010 307 180, JP-2011 201 328 and JP-2012 037 900.

The evaporators divulged have the disadvantage of not solidifying the PCMs homogeneously and completely in a sufficiently short space of time when the engine of the vehicle is in operation. Thus, it is possible that the PCMs might not be completely solidified when the vehicle stops, for example at a red light, and that they might not be able to cool the air blown into the interior for a sufficiently long length of time. In addition, the heat exchangers between the refrigerant fluid and the housings forming reservoirs of PCM are somewhat inefficient because the PCM reservoirs need to be provided with fins the task of which is to improve the efficiency of the heat transfer. These fins make the evaporator heavier. Furthermore, because of the arrangement of the PCM reservoirs in the evaporator, the ventilation fluid experiences mechanical friction as it passes through the evaporator. This mechanical friction results in pressure drops.

It is therefore an object of the invention to overcome these disadvantages.

SUMMARY OF DISCLOSURE

In order to achieve this, the invention provides, an evaporator for a motor vehicle air conditioning device comprising at least one refrigerant tube intended to allow the circulation of a refrigerant fluid and at least one storage member comprising at least one housing comprising a material referred to as a thermal storage material intended to store frigories and release them to a ventilation fluid intended to circulate towards an interior of the vehicle, characterized in that the housing has a substantially hemispherical shape.

According to the currently acknowledged thermodynamic model of solidification, a solid nucleus of spherical shape grows in the liquid. This is why, with a housing of hemispherical shape, the solidification of the thermal storage material takes place homogeneously and quickly. There is therefore no longer any need to insert fins into the PCM reservoirs.

For preference, the ventilation fluid is air.

This is the ventilation fluid most commonly used.

According to one embodiment, the thermal storage material comprises a phase change material.

With such a material, the solid/liquid phase change occurs over a narrow temperature range. Very little energy therefore needs to be supplied in order to achieve solidification.

Advantageously at least one wall of the refrigerant tube forms a wall of the housing.

There is therefore just one wall separating the PCM and the refrigerant fluid so heat transfers take place more efficiently. The evaporators described in applications US-2010 307 180, JP-2011 201 328 and JP-2012 037 900 have refrigerant tubes arranged partially in contact with PCM reservoirs. In particular, the evaporator described in application US-2010 307 180 comprises reservoirs of thermal storage material the cross section of which is of variable dimension. Thus, the reservoir is not systematically in contact with the refrigerant tube and heat transfer is therefore suboptimal. In addition, in the evaporators of the documents of the prior art, two walls separate the refrigerant fluid from the PCM and this reduces the efficiency of the heat transfer.

For preference, the member has at least two housings, the housings being connected to one another in fluidic communication.

The risks of overpressure within a single housing are thus limited.

According to one embodiment, the housings are connected to one another by means of a connecting duct.

Advantageously, the ratio between the radius of a housing and a dimension of the connecting duct connecting this housing to the other housing is comprised between 0.5 and 1.

When this ratio is close to 0.5, it is found that solidification occurs quickly.

According to one embodiment, each housing has a substantially hemispherical shape.

For preference, the radius of one housing is different from that of the other housing.

Advantageously, the storage member comprises a plurality of housings distributed at the nodes of a regular lattice. The housings therefore form a uniform distribution in space. This uniform distribution may be characterized by its unit cell. The unit cell is the simplest distribution of housings which repeats throughout the storage member. In two-dimensional space, lattices of orthorhombic, possibly centered, tetragonal or hexagonal type are particularly known.

The pressure drop experienced by the air passing through the evaporator is thus limited to 30% as compared with an evaporator without a reservoir of thermal storage material.

The invention also provides a motor vehicle air conditioning device characterized in that it comprises an evaporator as described hereinabove.

One embodiment of the invention will now be described by way of nonlimiting example with reference to the following figures.

DETAILED DESCRIPTION

Figure 1:
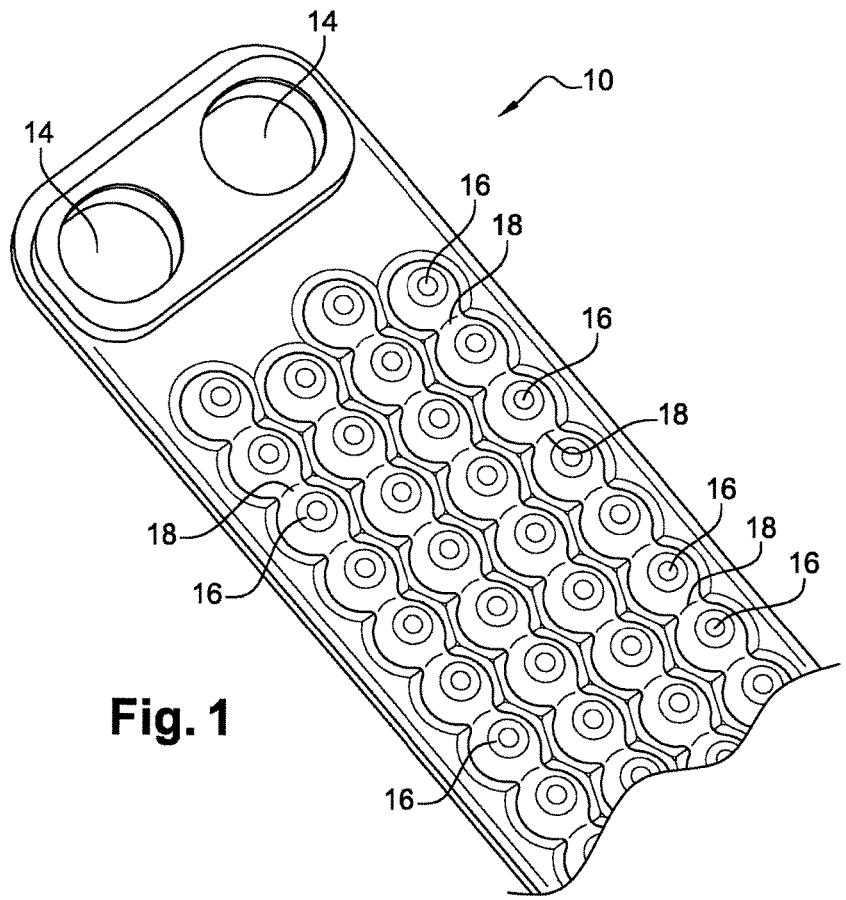
FIG. 1 is a perspective view of a storage member of the invention.
Figure 2:
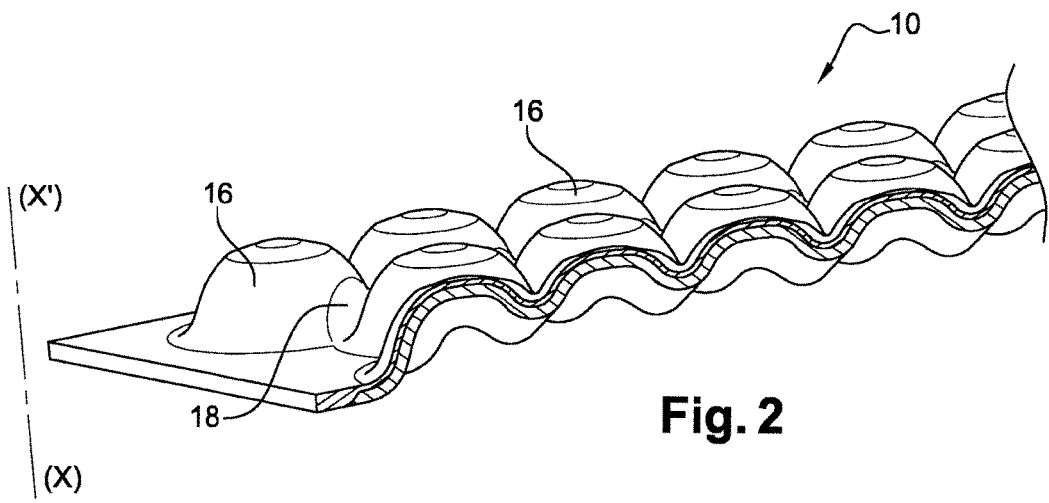
FIG. 2 is a perspective view and sectioned view of a housing comprising the thermal storage material.
Figure 3:
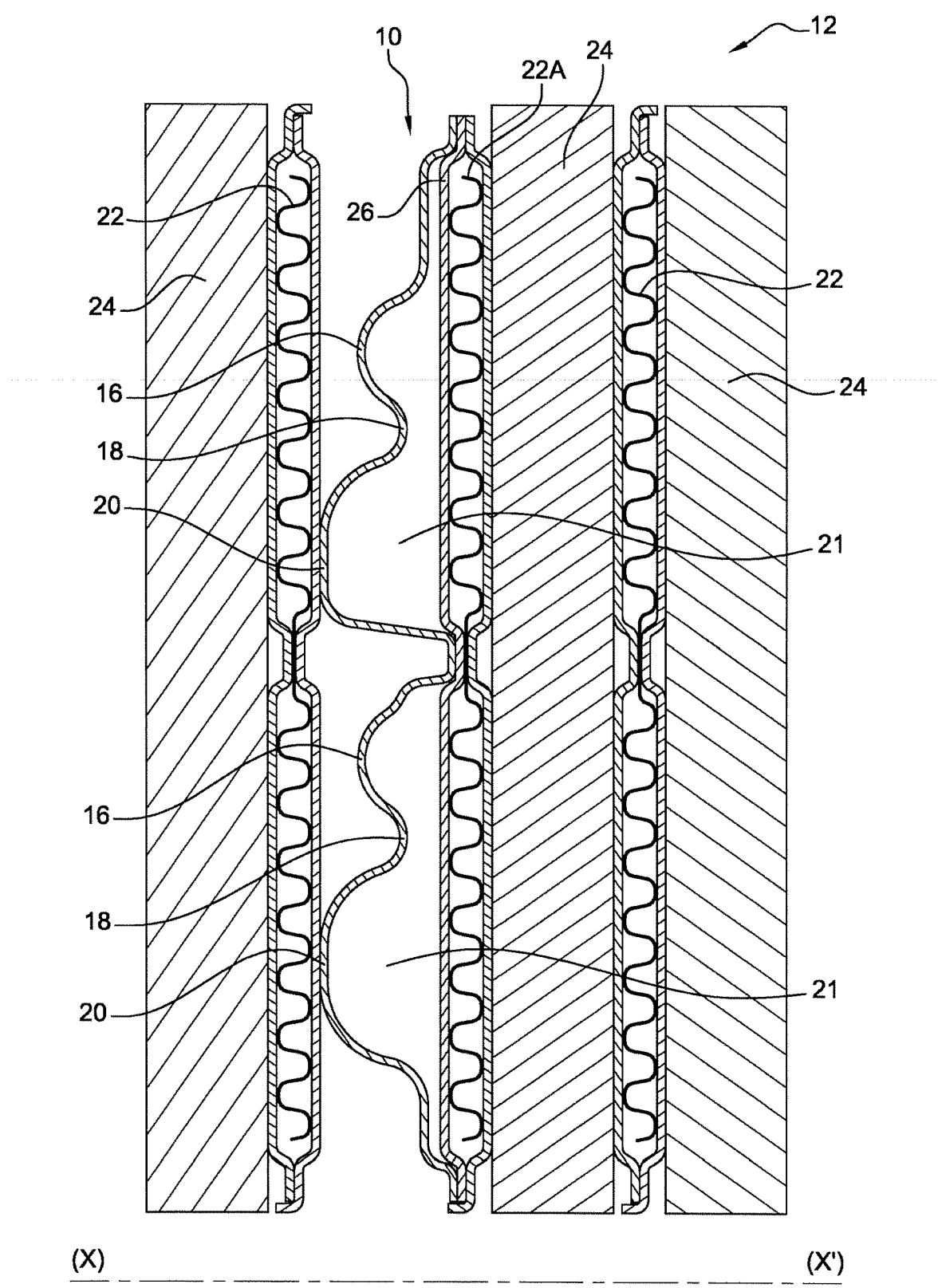
FIG. 3 is a sectioned view of part of an evaporator bearing a storage member according to an alternative form of the embodiment of the invention.

FIGS. 1 to 3, depict a storage member 10 of an evaporator 12 for a motor vehicle air conditioning device according to a first embodiment of the invention. The storage member 10 takes the form of a plate and comprises two orifices 14 allowing the member 10 to be connected to the other elements that make up the evaporator 12 using conventional means of assembly (not depicted).

As may notably be seen in FIGS. 1 and 2, the storage member 10 comprises a plurality of housings 16 of substantially hemispherical shape and connected to one another in fluidic communication by means of connecting ducts 18. A connecting duct 18 connects two adjacent housings 16 in fluidic communication. Along the axis (XX') running transversally to the storage member 10, the height of the connecting duct 18 is less than the radius of the housings 16. In this embodiment, the hemispherical housings 16 have the same radius, here 3.5 millimeters. According to an alternative form of the present embodiment, at least two hemispherical housings have radii which differ. Here, the ratio between the radius of a housing 16 and the dimension of the connecting duct 18 along the axis (XX') is 0.5, but in alternative forms, this radius is comprised between 0.5 and 1. In addition, the plurality of housings 16 is distributed at the nodes of a regular lattice referred to as a primitive hexagonal lattice by analogy with Bravais lattices. In alternative forms, the housings 16 are distributed according to another type of one-dimensional, two-dimensional or even three-dimensional regular lattice.

The dimension and distribution of the housings 16 have been devised to take account of the constraints involved in forming the aluminum which is the material from which the storage member 10 is produced. Aluminum is a lightweight material, and therefore, because of the absence of fins in the housings 16, the weight of the evaporator 12 is relatively low.

In addition the shape of the housings 16 and the way in which they are distributed in the storage member 10 are intended to limit the pressure drop experienced by a ventilation fluid passing through the evaporator 12. Here, the pressure drop does not exceed 30% by comparison with a similar evaporator without a storage member 10, or even with an evaporator comprising storage members distributed approximately one every four tubes.

In this exemplary embodiment of the invention, each housing 16 of the storage member 10 is of substantially hemispherical shape. According to an alternative form illustrated in FIG. 3, housings 16 of substantially hemispherical shape are connected to other housings 20 which are of substantially semi-ellipsoidal shape.

The housings 16 or 20 are intended to store frigories. In order to do so, the housings 16, 20 and the connecting ducts 18 are filled with a material referred to as a thermal storage material which in this instance is a phase change material (or PCM) 21 of a type known per se.

The evaporator 12 also comprises a plurality of refrigerant tubes 22 through which a refrigerant fluid circulates. This fluid may notably be of the HFO-1234yf type or any other refrigerant fluid capable of being used in motor vehicle air conditioning devices.

The evaporator 12 further comprises a plurality of rows of fins 24. Each row of fins 24, sometimes referred to as a corrugated interlayer, is positioned, along the axis (XX'), next to at least one refrigerant tube 22. These fins extend between two refrigerant fluid tubes 22, 22A like the storage member 10.

Figure 4:
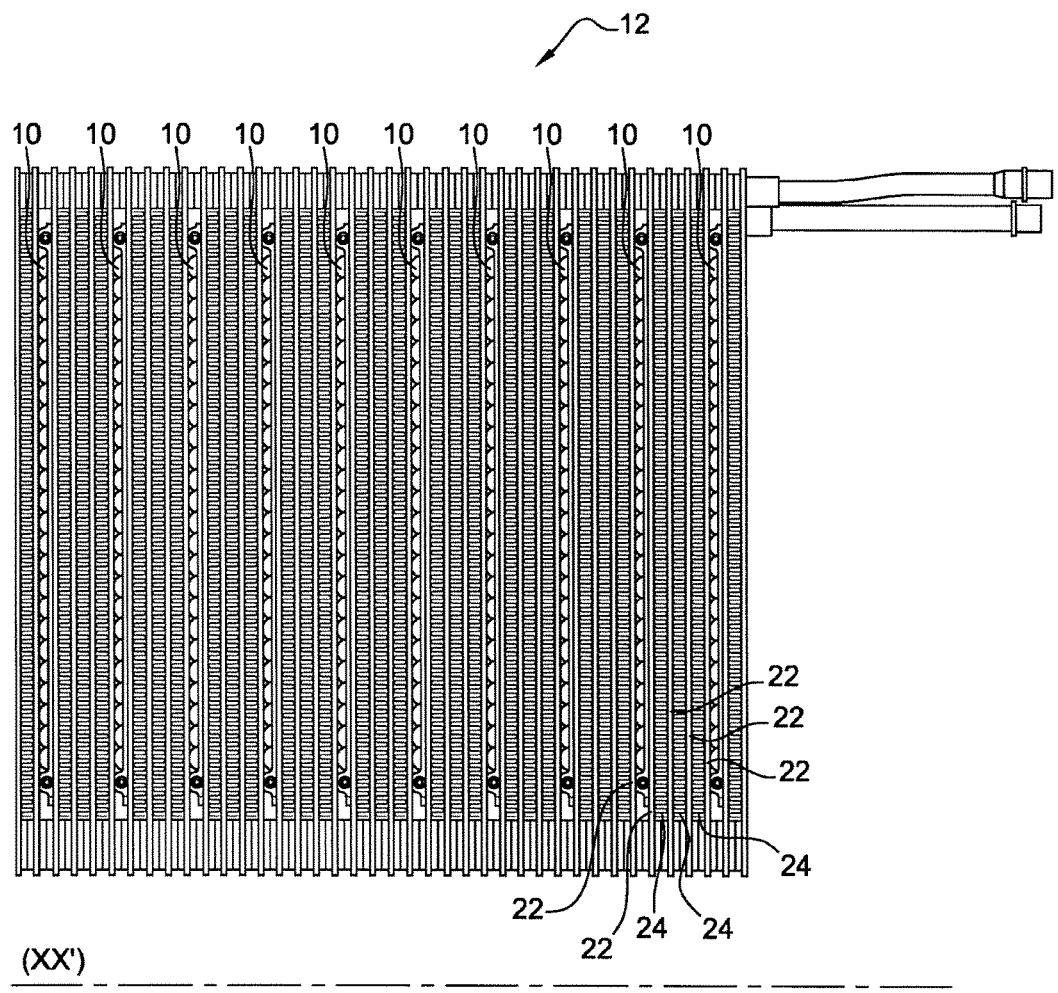
FIG. 4 is a perspective view of an evaporator comprising several storage members according to the invention.

FIG. 4 depicts an evaporator 12 comprising a plurality of storage members 10. The storage members 10 are uniformly arranged along the axis (XX') between two refrigerant tubes 22.

When the air conditioning device is in operation, the ventilation fluid, in this case air from outside the vehicle passes through the rows of fins 24. If the vehicle engine is running, the refrigerant fluid circulates throughout the air conditioning device. The refrigerant fluid therefore arrives at the evaporator 12 cold and therefore gives up frigories to the air passing through the rows of fins 24. The cooled air then circulates to the vehicle interior, which it may thus air-condition. At the same time, the refrigerant fluid releases some of its frigories to the PCM which solidifies. Because of the shape of the housings 16, 20, solidification occurs quickly and homogeneously. In addition, since solidification is an exogenous process, the PCM thus constitutes a "frigories reservoir".

The transfer of heat, notably between the refrigerant tube 22A and the housings 16, 20 is all the more effective when, as may be seen from FIG. 3, a wall 26 delimiting the refrigerant tube 22A is also a wall delimiting the housings 16, 20. Thus, there is just one partition separating the tube 22A and the housings 16, 20. In addition, because the wall 26 is common to the housing 16, 20 and to the refrigerant tube 22A, the PCM is in contact with the refrigerant tube 22A over the entire surface of the wall 26, this too making it possible significantly to improve the efficiency of the transfer of heat between the PCM and the refrigerant liquid inside the tube 22A.

When the vehicle engine is not running, because the vehicle has stopped for a brief time, and when a user of the vehicle operates the air conditioning device, the PCM in the housings 16, 20 liquefies. Because liquefaction is endothermic the PCM releases the frigories it accumulated during solidification to the refrigerant liquid in the refrigerant tubes 22, 22A. The refrigerant liquid cools and in turn releases frigories to the air circulating through the rows of fins 24. The air is cooled and then blown into the vehicle interior which it air-conditions.

Of course, numerous modifications could be made to the invention without departing from the scope thereof.

In particular, the shape or arrangement of the fins could be modified, the arrangement of the storage members 10 and of the refrigerant tubes 22 relative to one another within the evaporator 12 could be varied.

It might also be possible to use various regular patterns for the layout of the housings 16, 20 of the storage member 10.

What is claimed:

1. An evaporator for a motor vehicle air conditioning device comprising:
    at least one refrigerant tube configured to allow circulation of a refrigerant fluid; and
    at least one storage member comprising at least one housing comprising a thermal storage material for storing and releasing frigories to a ventilation fluid configured to circulate towards an interior of the vehicle,
    wherein the housing has a substantially hemispherical shape, and
    wherein the at least one storage member has at least two housings, the at least two housings being connected to one another in fluid communication, wherein the at least two housings are connected to one another by a connecting duct, and wherein the ratio between the radius of a housing and a dimension of the connecting duct connecting this housing to the other housing is comprised between 0.5 and 1.

2. The evaporator as claimed in claim 1, in which the ventilation fluid is air.

3. The evaporator as claimed in claim 1, wherein the thermal storage material comprises a phase change material.

4. The evaporator as claimed in claim 1, wherein at least one wall of the refrigerant tube forms a wall of the housing.

5. The evaporator as claimed in claim 1, wherein each housing has a substantially hemispherical shape.

6. The evaporator as claimed in claim 1, wherein a radius of one of the at least two housings is different from that of another of the at least two housings.

7. The evaporator as claimed in claim 1, wherein the storage member comprises a plurality of housings distributed at the nodes of a regular lattice.

8. An air-conditioning device for a motor vehicle, comprising an evaporator as claimed in claim 1.

* * * * *